(12) United States Patent
Konradi et al.

(10) Patent No.: US 9,727,159 B2
(45) Date of Patent: Aug. 8, 2017

(54) CONTROLLER AND METHOD FOR CONTROLLING A CAPACITIVE TOUCH SCREEN OR THE LIKE

(76) Inventors: Vadim Konradi, Austin, TX (US);
Parker Dorris, Austin, TX (US);
Michael Franklin, Austin, TX (US);
David R. Welland, Austin, TX (US)

( * ) Notice: Subject to any disclaimer, the term of this patent is extended or adjusted under 35 U.S.C. 154(b) by 1007 days.

(21) Appl. No.: 13/342,673

(22) Filed: Jan. 3, 2012

(65) Prior Publication Data

US 2013/0169584 A1    Jul. 4, 2013

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01)

(58) Field of Classification Search
USPC .................................................. 345/173, 174
See application file for complete search history.

(56) References Cited

U.S. PATENT DOCUMENTS

| | | | |
|---|---|---|---|
| 8,363,021 B2 | 1/2013 | Krah et al. | |
| 2003/0067451 A1* | 4/2003 | Tagg et al. | 345/174 |
| 2006/0227114 A1* | 10/2006 | Geaghan et al. | 345/173 |
| 2008/0157882 A1* | 7/2008 | Krah | G06F 3/0416 331/18 |
| 2008/0157893 A1 | 7/2008 | Krah | |
| 2009/0315851 A1 | 12/2009 | Hotelling et al. | |
| 2010/0033422 A1 | 2/2010 | Mucignat et al. | |
| 2010/0328265 A1 | 12/2010 | Hotelling et al. | |
| 2011/0007028 A1* | 1/2011 | Curtis et al. | 345/174 |
| 2011/0310051 A1* | 12/2011 | Souchkov | 345/174 |
| 2012/0043970 A1* | 2/2012 | Olson | 324/601 |
| 2012/0229415 A1* | 9/2012 | Schwartz et al. | 345/174 |
| 2013/0021289 A1 | 1/2013 | Chen et al. | |
| 2013/0050132 A1 | 2/2013 | Maravilla et al. | |

OTHER PUBLICATIONS

Actions on the Merits for copending U.S. Appl. No. 13/342,658, filed Jan. 3, 2012.

\* cited by examiner

*Primary Examiner* — William Boddie
*Assistant Examiner* — Bipin Gyawali
(74) *Attorney, Agent, or Firm* — Polansky & Associates, P.L.L.C.; Paul J. Polansky

(57) ABSTRACT

A controller for a capacitive touch screen includes a touch resolve subsystem and a processor. The touch resolve subsystem, in response to a trigger input, measures a plurality of capacitance values using a plurality of input pins. The processor controls the touch resolve subsystem to acquire a baseline capacitance in a calibration mode, to acquire a frame comprising the plurality of capacitance values in a normal operation mode, and to update the baseline capacitance to a new baseline capacitance in the normal operation mode in response to the frame without entering the calibration mode.

9 Claims, 6 Drawing Sheets

CONTROLLER AND METHOD FOR CONTROLLING A CAPACITIVE TOUCH SCREEN OR THE LIKE

CROSS REFERENCE TO RELATED, COPENDING APPLICATION

Related subject matter is found in a copending patent application entitled "Controller and Method for Controlling a Capacitive Touch Screen or the Like," application Ser. No. 13/342,685, invented by Vadim Konradi, Parker Dorris, Michael Franklin, and David R. Welland, filed of even date herewith and assigned to the assignee hereof.

FIELD OF THE DISCLOSURE

The present disclosure relates generally to display controllers, and more particularly, to controllers for capacitive touch screens.

BACKGROUND

Many modern cellular telephones, such as the smart phone sold under the trademark "iPhone" by Apple Computer, Inc, use capacitive touch screens. Touch screens are used to locate the two-dimensional position of an object such as a human finger on the surface of the touch screen. These touch screens are substantially transparent to allow an underlying screen display to be visible to the user, allowing the user to interact intuitively with the images in the screen display. A capacitive touch screen is formed by a grid of rows and columns of conductors in which the rows and columns are separated by a dielectric material. The intersections of the rows and columns represent possible touch positions. A touch screen controller transmits pulses to each of the rows of the grid while measuring resulting signals on each of the columns. The controller identifies a touch position based on small disturbances in capacitance caused by the user's finger touching the surface of the touch screen. However since the disturbances in capacitance are small, nearby electrical circuits such as phone chargers that emit significant electrical interference can corrupt the position determination.

SUMMARY

In an exemplary embodiment, a controller for a capacitive touch screen includes a touch resolve subsystem and a processor. The touch resolve subsystem, in response to a trigger input, measures a plurality of capacitance values using a plurality of input pins. The processor controls the touch resolve subsystem to acquire a baseline capacitance in a calibration mode, to acquire a frame comprising the plurality of capacitance values in a normal operation mode, and to update the baseline capacitance to a new baseline capacitance in the normal operation mode in response to the frame without entering the calibration mode.

In another exemplary embodiment, a controller for a capacitive touch screen includes a touch resolve subsystem and a controller. The touch resolve subsystem, in response to a trigger input, measures a plurality of capacitance values using a plurality of input pins. The processor controls the touch resolve subsystem to acquire a frame comprising the plurality of capacitance values, determines a level of interference in the frame, and uses the frame to determine a touch location if the level of interference is less than a first threshold.

In yet another exemplary embodiment, information from a capacitive touch screen is acquired by acquiring a baseline capacitance using a plurality of input pins in a calibration mode. A frame comprising a plurality of capacitance values is acquired using the plurality of input pins in a normal operation mode. The baseline capacitance is updated to a new baseline capacitance in the normal operation mode in response to the frame without entering the calibration mode

BRIEF DESCRIPTION OF THE DRAWINGS

The present disclosure may be better understood, and its numerous features and advantages made apparent to those skilled in the art by referencing the accompanying drawings, in which.

In the following description, the use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
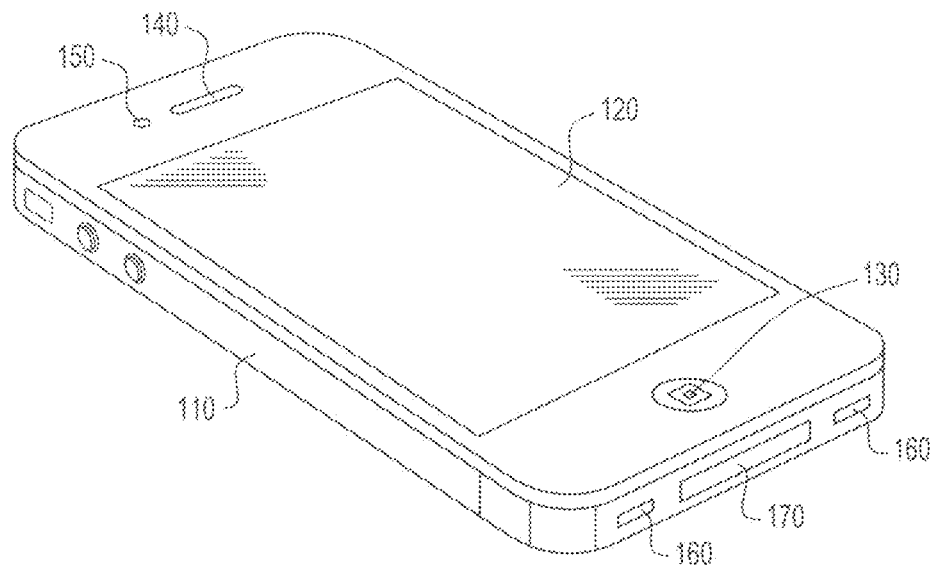
FIG. 1 illustrates in perspective view a cellular telephone with a touch screen.

FIG. 1 illustrates in perspective view a cellular telephone 100 with a touch screen. Cellular telephone 100 includes a body 110 having a capacitive touch screen 120 for measuring multiple user touches formed in an upper surface thereof. Cellular telephone 100 also includes at the upper surface a home button 130, a loudspeaker opening 140, and a camera sensor opening 150. A proximal end of body 110 includes two openings 160 for loudspeakers used in a speakerphone mode, and an opening 170 for connecting the smart phone to a wall charger.

Cellular telephone 100 is a cellular telephone sold under the brand name "iPhone" by Apple Computer, Inc., but is representative of any of a number of other cellular telephones. A feature of cellular telephone 100 is that capacitive touch screen 120 is capable of resolving multiple simultaneous touches. The ability of cellular telephone 100 to correctly resolve multiple touches on touch screen 120 provides an aesthetically pleasing experience to allow the user to interact intuitively with the images generated by the operating system and by various application programs.

Cellular telephones from other manufacturers also include single- and multi-touch capacitive touch screens. Moreover other devices such as personal digital assistants also use capacitive touch screens. Thus cellular telephone 100 is only illustrative of a class of products using touch screens in which the controller described below may advantageously be used.

Figure 2:
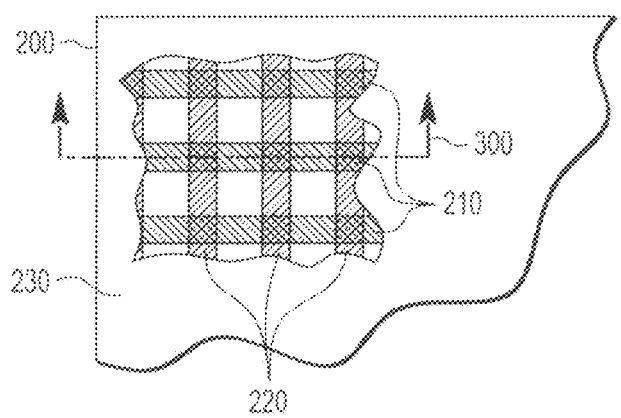
FIG. 2 illustrates a top view of the touch screen of FIG. 1.

FIG. 2 illustrates a top view of a portion of a capacitive touch screen 200. Capacitive touch screen 200 includes a grid of horizontal rows and vertical columns, including representative rows 210 and representative columns 220 lying underneath a clear lens cover 230. A cutaway portion of lens cover 230 reveals portions of representative rows 210 and representative columns 220, which are highlighted by cross hatching but are not visible to the user. A cross section 300 taken along one of the rows 210 will be used to explain the relevant electrical features of touch screen 200 in conjunction with FIG. 3 below.

Figure 3:
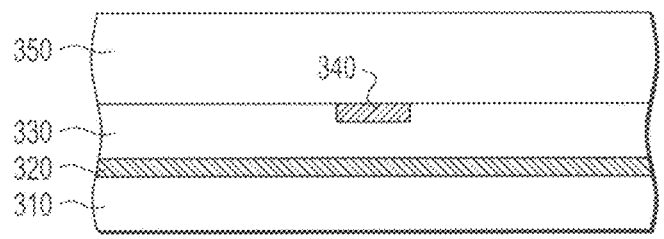
FIG. 3 illustrates a cross sectional view of the touch screen of FIG. 2.

FIG. 3 illustrates a cross sectional view 300 of touch screen 200 of FIG. 2. A clear insulating layer 310 overlies a graphical display, not shown in FIG. 3. Lying above insulating layer 310 is a clear conductive layer 320 forming a portion of one of rows 210. Overlying conductive layer 320 is a further clear insulating layer 330. Within a portion of a top surface of layer 330 is a clear conductor 340 forming a portion of one of columns 220. Overlying the top surface of insulating layer 330 is a clear cover lens 350. Insulating layers 310 and 330 and cover lens 350 can be formed using polymer films or other optically clear adhesives. Conductive layers 320 and 340 can be formed using transparent indium tin oxide or any other suitable transparent conductive film.

Cross section 300 is useful in illustrating how capacitance is formed and affected by touch. The user's finger is nominally at ground potential. During a scanning operation, the touch screen controller holds receive conductor 340 at ground potential and drives transmit conductor 320 with a varying voltage. The varying voltage induces a current in receive conductor 340 through the transmit-receive capacitor. The touch screen controller includes an integrating circuit to isolate and measure the charge injected into receive conductor 340. The accumulated measured charge indicates the mutual capacitance between the two conductors.

Without a finger touch, electrical field lines known as fringing field lines occupy a considerable space surrounding conductor 340 and extend through cover 350. When a finger touches the touch screen in the proximity of the row-column intersection, flux lines form between the transmit conductor and the finger, displacing much of the fringing field and reducing the mutual capacitance between the row and column conductors. The touch screen controller can detect the change in capacitance (ΔC) and forms a map of the changes for all row-column intersections. By analyzing this map, the touch screen controller can determine one or more touch locations.

Figure 4:
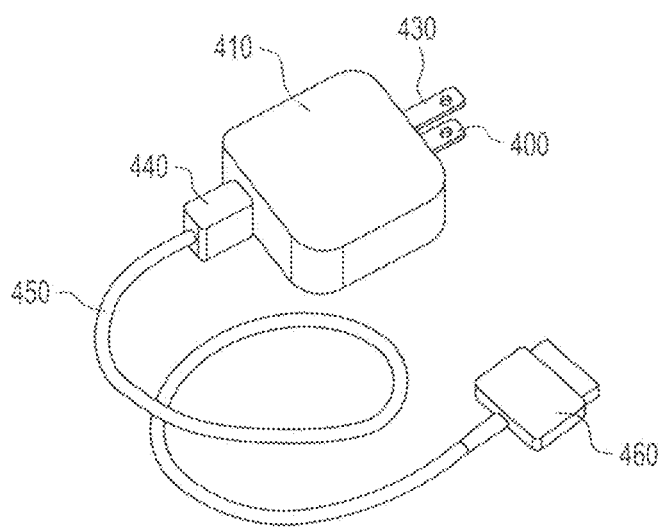
FIG. 4 illustrates a wall charger for use with the cellular telephone of FIG. 1.

FIG. 4 illustrates a wall charger 400 for use with cellular telephone 100 of FIG. 1. Wall charger 400 includes a charger body 410 that houses a switch mode power supply (SMPS) for reducing the alternative current (AC) or "mains" voltage, nominally at about 120 volts RMS for the United States but ranging from 100-240 volts RMS worldwide, to a level suitable for charging a battery integrated into cellular telephone 100, and changing the voltage to a direct current (DC) voltage. Charger body 410 includes a plug formed by tines 420 and 430 on a distal end, and attaches to a cable 450 on a proximal end. Cable 450 has a first connector 440 for electrically and physically connecting to the circuitry inside charger body 410, and a second connector 460 for electrically and physically connecting to the cellular phone, in this particular example, through opening 170 as shown in FIG. 1.

Wall charger 400 provides a source of significant signal interference that can corrupt the touch screen position measurement. The SMPS controller in wall charger 400 makes a power transistor alternatively conductive and non-conductive to selectively source current through a transformer. The relatively large, discretely switched currents cause the charger to emit significant interference having energy at the switching frequency and at harmonically related frequencies. The emitted energy is absorbed as interference in the touch screen and can affect the integrity of the touch determination. Note that wall charger 400 is just one example of a significant interfering energy source.

Figure 5:
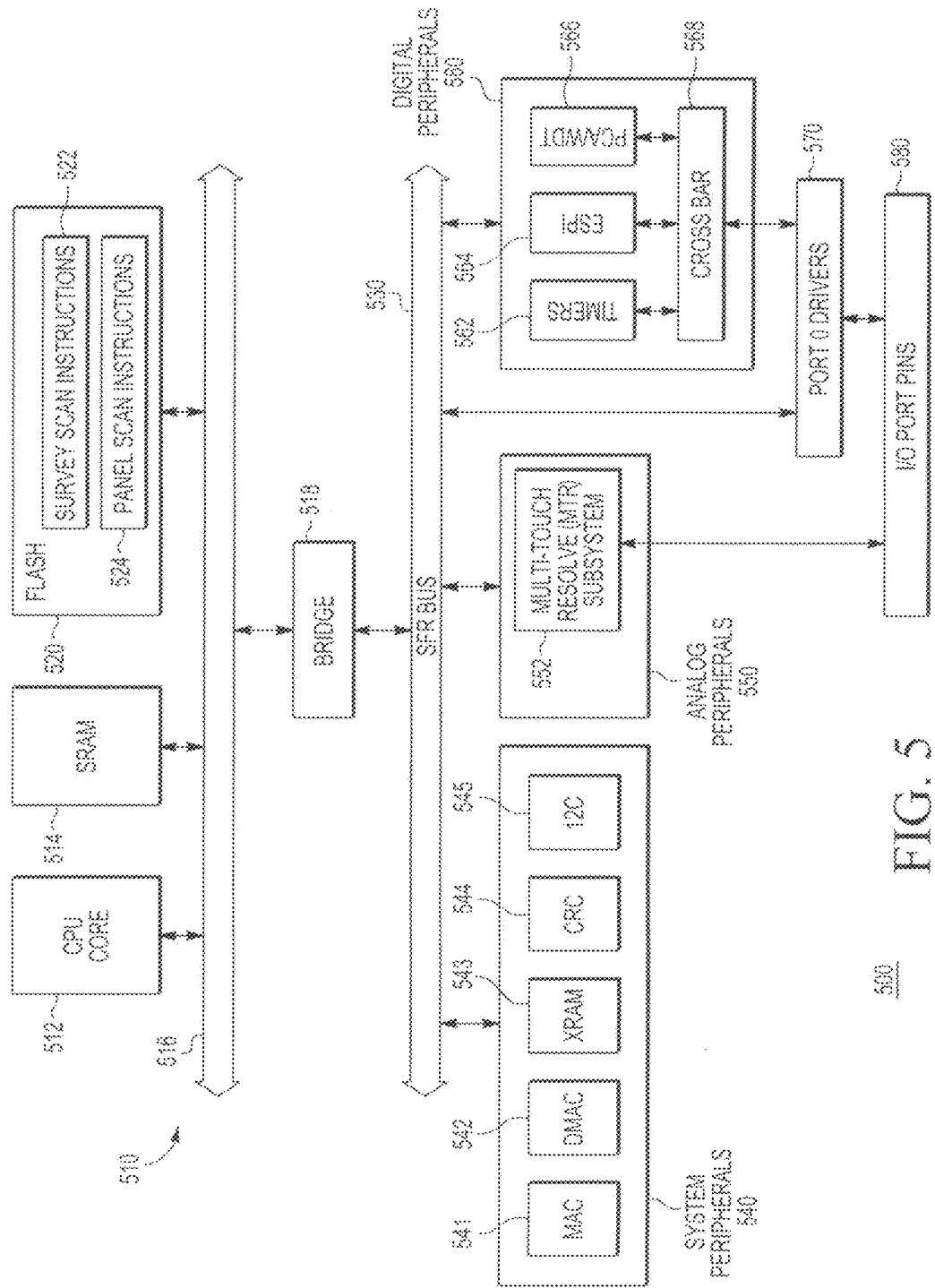
FIG. 5 illustrates in block diagram form a microcontroller suitable for use with a capacitive touch screen.

FIG. 5 illustrates in block diagram form a microcontroller 500 suitable for use as a capacitive touch screen controller. Microcontroller 500 includes generally a set of devices 510 connected to a processor bus 516, a bridge 518, a peripheral bus 530 labeled "SFR BUS", a set of system peripherals 540, a set of analog peripherals 550, a set of digital peripherals 560, a set of port drivers labeled "PORT 0 DRIVERS" 570, and a set of I/O port pins 580, all combined in a single integrated circuit.

Devices 510 include a central processing unit (CPU) core 512, a volatile memory in the form of a static random access memory (SRAM) 514, and a nonvolatile memory ("FLASH" memory) 520. CPU core 512, SRAM 514, and FLASH memory 520 each has inputs and outputs connected to processor bus 516. Processor bus 516 serves as a communication channel for conducting address, data, and control signals for communication between devices on CPU bus 516, and between other devices through bridge 518. SRAM 514 serves as a working memory and parameter storage area for CPU core 512. FLASH memory 520 serves to store parameters and programs for CPU 512 in a non-volatile fashion.

In particular, FLASH memory 520 includes a first area 522 for storing instructions related to a first type of scan operation known as a "survey scan", and a second area 524 for storing instructions related to a second type of scan operation known as a "panel scan". MCU 500 uses the survey scan instructions to determine the presence of signal interference in the touch screen and to selectively change a parameter that is used to perform the panel scan. MCU 500 uses the panel scan instructions to locate the position of one or more fingers on the touch screen at a selected value of the parameter. As will be described below, the parameter can be any quantity that affects how a panel scan operation is performed. For example, the parameter can be scan frequency, the number of scan pulses per scan line, and whether to implement a highpass filter in the receiver. However these parameters are just illustrative and other parameters are also possible.

Bridge 518 is connected between processor bus 516 and SFR bus 530 and is the mechanism for routing accesses originating on one bus to the other bus. For example, if CPU core 512 attempts to write a value to a memory address associated with a peripheral in digital peripherals 560, bridge 518 would allow the access to be completed on SFR bus 530 and perform any appropriate or desired timing and signal translation.

System peripherals 540 have inputs and outputs connected to SFR bus 530 and include peripherals that perform functions of a global nature in MCU 500. For example, system peripherals 540 include a multiplier-accumulator (MAC) 541, a direct memory access controller (DMAC)

542, an SRAM 543 mapped to the external memory space labeled "XRAM" 543, a cyclic redundancy check (CRC) calculation unit 544, and a serial communication bus peripheral labeled "I2C". Aside from DMAC 542, the peripherals in system peripherals 540 will not be described further.

Analog peripherals 550 have inputs and outputs connected to SFR bus 530 and include peripherals that perform analog signal related functions. Analog peripherals 550 include a multi-touch resolve (MTR) subsystem 552, and other peripherals not relevant to touch screen control and that will not be described further. MTR subsystem 552 is a circuit adapted to transmit pulses to rows of the touch screen, and to and make direct measurements by receiving signals from the columns of the touch screen. MTR subsystem 522 is designed to work in conjunction with a touch screen program that includes both survey scan instructions 522 and panel scan instructions 524, and will be described more fully with respect to FIG. 6 below.

Digital peripherals 560 have inputs and outputs connected to SFR bus 530 and include peripherals that perform digital signal related functions. Digital peripherals 560 include a set of timers 562, an enhanced serial peripheral interface (ESPI) 564, a programmable counter/timer array with a watchdog timer (PCA/WDT) 566, and a crossbar 568 for selecting among the digital peripherals for connection to I/O ports 580.

Port 0 drivers 570 allow either CPU core 512 or selected ones of digital peripherals 560 to read values from and/or write values to pins in I/O port pins 580. I/O port pins 580 are also connected to MTR subsystem 552 through inputs and outputs thereof. I/O port pins 580 include terminals that may be programmably mapped to transmit and receive terminals of MTR subsystem 552 for connection to the rows and columns, respectively, of a capacitive touch screen.

In addition to performing other functions, MCU 500 operates as a touch screen controller to resolve positions of one or more touches on a capacitive touch screen using MTR subsystem 552. In other embodiments, the functions of a capacitive touch screen controller can be performed by different combinations of hardware and software.

At startup, MCU 500 first determines a baseline capacitance by measuring the capacitance at each position on the touch screen grid in an untouched condition, and then averaging the capacitance measurements to obtain an overall baseline capacitance. The baseline capacitance represents the parasitic capacitance in the conductors between MCU 500 and the touch screen. The baseline capacitance varies according to the scan frequency, and capacitance values measured during a survey scan operation or a panel scan operation are adjusted by adding or subtracting the baseline capacitance, as the case may be, corresponding to the selected scan frequency.

In one embodiment, MCU 500 measures a baseline capacitance at each allowable scan frequency at initialization. MCU 500 then selects a scan frequency and performs two types of scan operations on the capacitive touch screen. MCU 500 performs the first type, known as a survey scan, using survey scan instructions 522 to determine the amount of interference being absorbed from other devices such as switch mode power supplies as the scan frequency varies. MCU 500 performs the second type, known as a panel scan, using panel scan instructions 524 at the selected scan frequency to determine one or more touch locations.

MCU 500 intelligently selects values of parameters that are used to perform the panel scan to reduce interference and thereby improve the integrity of the touch measurement. MCU 500 uses the measured capacitance values from MTR subsystem 552 to create an interference map. The interference map identifies the level of interference at different values of the parameter and MCU 500 uses the map to select a value for that parameter. Parameters which may be varied based on interference include but are not limited to scan frequency, number of scan pulses per acquisition, and whether to implement a highpass filter in the receiver.

In one embodiment, MCU 500 builds the interference map with respect to scan frequency by starting at the lowest frequency and determining the level of interference at that frequency by measuring the difference in measured capacitance at each position between two sequential frames. Since touch conditions do not change quickly between sequential scan frames, the AC between sequential frames mostly represents interference. MCU 500 then increments the scan frequency and determines a level of interference at that frequency for all available values of the scan frequency. In another embodiment, MCU 500 builds the interference map with respect to scan frequency by disabling the transmit conductors while measuring the receive conductors for each scan frequency. MCU 500 selects an appropriate scan frequency as the selected scan frequency. For example MCU 500 may select the scan frequency with the lowest interference. However since touch resolution is generally better at higher scan frequencies, in one particular embodiment MCU 500 considers both interference and scan frequency with a bias toward higher scan frequencies. The level of bias will vary between embodiments, but the existence of the bias implies that for two values of scan frequency for which the level of interference is substantially the same, MCU 500 will select the higher scan frequency.

After using the interference map to select the desired value of the parameter, such as scan frequency, MCU 500 determines touch locations, if any, based on capacitance values measured by MTR 552 using the selected value of the parameter, under control of panel scan instructions 524. Panel scan instructions 524 determine a touch location as the centroid of an area of sufficiently reduced capacitance.

MCU 500 also interleaves survey scan operations with panel scan operations during normal operation. In this way, MCU 500 reacts to changing environmental conditions by repeatedly re-assessing the value of the parameter to determine whether to change it.

If MCU 500 decides to change scan frequency, it changes the baseline capacitance to that corresponding to the new scan frequency. In one embodiment, at initialization when in a calibration mode, MCU 500 measures the baseline capacitance for the initial scan frequency and also for each possible scan frequency, and stores the results as a table of baseline offsets with respect to a reference frequency for later use. This baseline offset table is constructed at initialization when the touch screen is in an untouched condition. When using the baseline offset table, MCU 500 computes the new baseline as the current baseline minus the offset of the current baseline, plus the baseline offset of the new detector frequency. In an alternative embodiment, MCU 500 measures the baseline capacitance at the initial scan frequency at initialization, and calculates new baseline capacitance values algorithmically when changing the scan frequency during normal operation based on the new selected scan frequency. This allows the baseline to be switched on-the-fly without the touch panel being in an untouched condition.

The measured capacitance also depends on the number of scan pulses N applied before the value on the column is read. If N is a parameter that is changed, the new baseline capacitance could also be determined algorithmically using a value as a reference number of pulses, and adjusting the baseline capacitance by the ratio of the new value of N to the reference value.

It should be apparent that MCU 500 is just one example of an MCU that is capable of operating as a capacitive touch screen controller, and in other embodiments, other MCUs and other controllers may be used. Moreover, the division of tasks between hardware and software in the touch screen controller may be varied in other embodiments.

Figure 6:
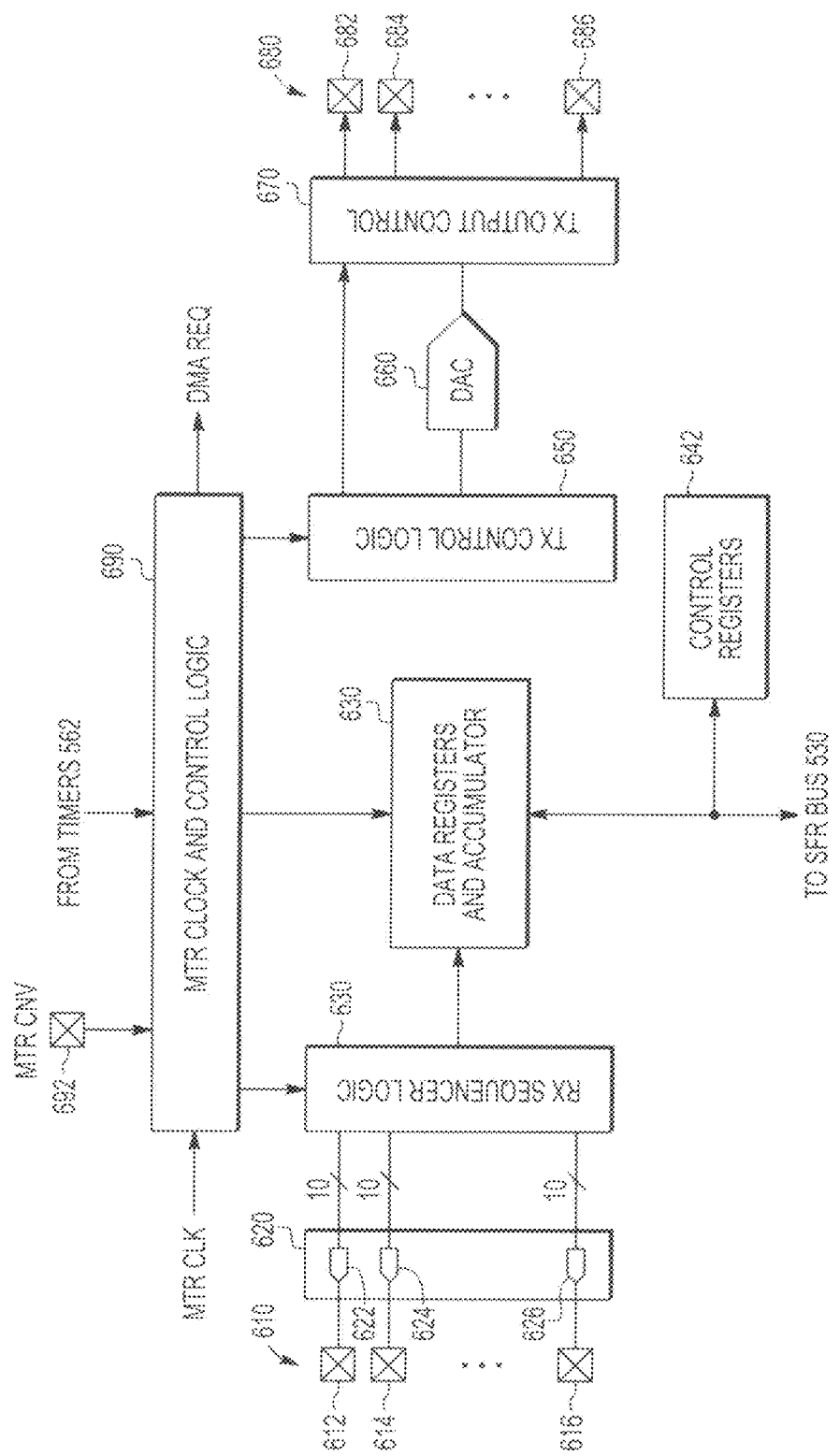
FIG. 6 illustrates in block diagram form the multi-touch resolve (MTR) subsystem of FIG. 5.

FIG. 6 illustrates in block diagram form MTR subsystem 552 of FIG. 5. MTR subsystem 552 includes generally a set of input terminals 610, a set of receivers 620, a receive (Rx) sequencer logic block 630, data registers and accumulator block 640, a set of control registers 642, a transmit (Tx) control logic block 650, a digital-to-analog converter 660, a transmit (Tx) output control block 670, a set of output terminals 680, and an MTR clock and control logic block 690.

Input terminals 610 represent terminals of I/O port pins 580 that have been programmably associated with the touch screen columns. Shown in FIG. 6 are representative terminals 612, 614, and 616. The number of terminals dedicated to the column/receive terminals will depend on the size and resolution of the touch screen used. In one embodiment, a selection circuit, not shown in FIG. 6, programmably maps the terminals to the receivers.

Receivers 620 include representative receivers 622, 624, and 626. Each receiver corresponds to one of input terminals 610, and provides a 10-bit digital code that is proportional to the capacitance value between the transmit and receive terminals.

Rx sequencer logic 630 has a control input, signal inputs connected to each receiver, and an output. In response to the control input, Rx sequencer logic 630 reads the value at the output of selected ones of receivers 620 and provides it on the output.

Data registers and accumulator 640 temporarily stores values representing a frame of capacitance data. It has a first input connected to the output of Rx sequencer logic 630, a control input, and an output adapted to connect to SFR bus 530. It includes an accumulator to add multiple capacitance measurements in hardware. Control registers 642 are connected to SFR bus 530 and include a set of registers whose outputs are connected to various blocks in MTR subsystem 552 to programmably control the operation thereof.

Tx control logic 650 has a control input and first and second control outputs. Tx control logic 650 uses the first control output to select a channel. In a single scan mode, Tx control logic 650 activates the first control output to select a programmable one of the available channels. In a panel scan mode, Tx control logic 650 includes a state machine to select all of the channels in sequence.

DAC 660 receives the second control output of Tx control logic 650 and outputs a pulse whose voltage magnitude is selectable based on a digital code stored in control registers 642, in synchronization with the second control signal received from Tx control logic 650.

Tx output control 670 has a first input for receiving a selection signal from the first control output of Tx control logic 650, and routes the voltage on the output of DAC 660 to an output terminal corresponding to a selected channel, while keeping the other output terminals inactive.

Output terminals 680 represent terminals of I/O port pins 580 that have been programmably associated with the touch screen rows. Shown in FIG. 6 are representative terminals 682, 684, and 686. The number of terminal dedicated to the row/transmit terminals will depend on the size and resolution of the touch screen.

MTR clock and control logic 690 has an input for receiving a clock labeled "MTR CLK", a first trigger input coupled to a terminal 692 for receiving a signal labeled "MTR CNV", a second trigger input for receiving a trigger signal from timers 560, an output for providing a direct memory access request signal labeled "DMA REQ" to DMAC 542, and control outputs connected to Rx sequencer logic 630, data registers and accumulator 640, and Tx control logic 650. In response to either an activation of the MTR CNV signal or a periodic trigger input signal received from timers 562, MTR clock and control logic 690 controls the various blocks of MTR subsystem 552 to perform a capacitance measurement operation according to the modes programmed in control registers 642. In response to data registers 640 performing a complete scan, MTR clock and control logic 690 programmably activates the DMA REQ signal to cause DMAC 542 to transfer the measured capacitance values to SRAM 514, and to interrupt CPU 512 to process this information.

MTR subsystem 552 efficiently performs some of the lower level tasks associated with touch screen scanning, including the survey scans that MCU 500 uses to continuously measure interference as one or more parameters vary over their allowed ranges. In other embodiments, MTR subsystem 552 could perform more or fewer functions. For example, MTR subsystem 552 could include its own embedded controller and firmware or microcode to perform the aforementioned tasks to output a touch location indicator without CPU intervention.

Figure 7:
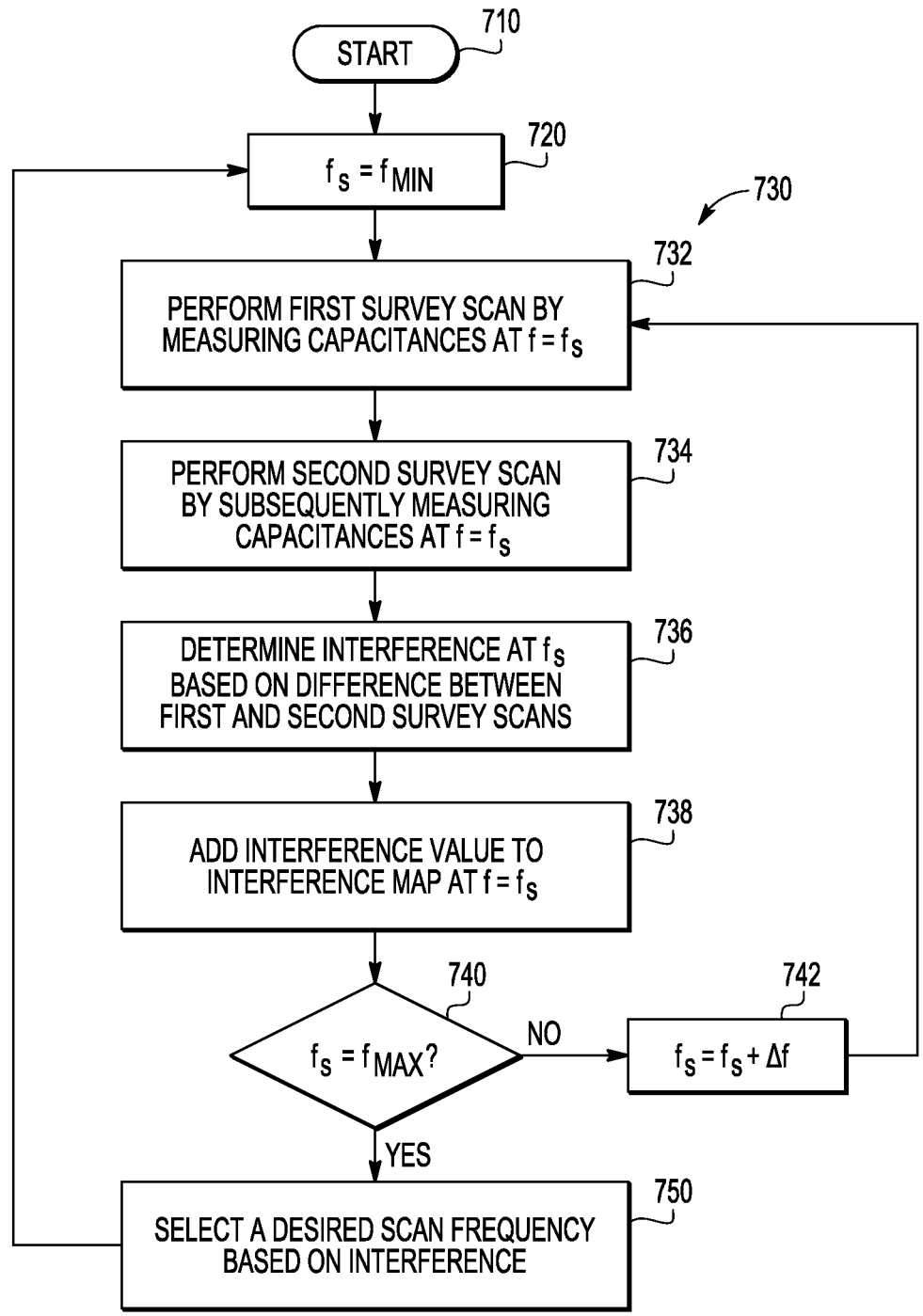
FIG. 7 illustrates a flow diagram of the microcontroller of FIG. 5 for building an interference map.

FIG. 7 illustrates a flow diagram 700 of microcontroller 500 of FIG. 5 for building an interference map according to the first embodiment described above. The flow starts at step 710, and the initial scanning frequency ($f_S$) is set to the minimum value of its range ($f_{MIN}$) at step 720. Next interference is measured at $f_S$ in a set of steps 730. Steps 730 begin with a step 732 at which a first survey scan is performed. In step 732, MTR subsystem 552 measures capacitance at each point in the touch screen as described above using $f=f_S$. Step 732 is followed by a step 734 in which MTR subsystem 552 performs a second survey scan to measure capacitance again at each point in the touch screen as described above, again using $f=f_S$. At a step 736, MCU 500 executing survey scan instructions 522 determines interference at $f_S$ based on the difference between the first and second survey scans. Since finger position changes relatively slowly, a large variation between the survey scans indicates the presence of interference at $f_S$. Then at step 738, MCU 522 executing survey scan instructions 522 adds the measured interference to the interference map.

At decision box 740, $f_S$ is compared the maximum value of its range ($f_{MAX}$). If $f_S < f_{MAX}$, then $f_S$ is incremented by an appropriate amount $\Delta f$ at step 742, and flow returns to step 732. If $f_S = f_{MAX}$, then at step 750 a desired scan frequency is selected based on the interference map.

An aspect of MCU 500 is that flow resumes at step 720 to repeat the process of measuring interference for each value of $f_S$. In this way, MCU 500 continuously updates the interference map during normal operation and makes decisions to change operating values of scan frequency as environmental conditions change. Generally it is desirable to choose the scan frequency with the lowest interference, but the decision may be biased toward higher scan frequency as discussed above.

Another one of the possible parameters is the number of scan pulses N per frame. In a controller that varies N based on interference, a flow in survey scan instructions 522 analogous to flow 700 will determine an interference map describing the amount of interference versus the value of N.

Figure 8:
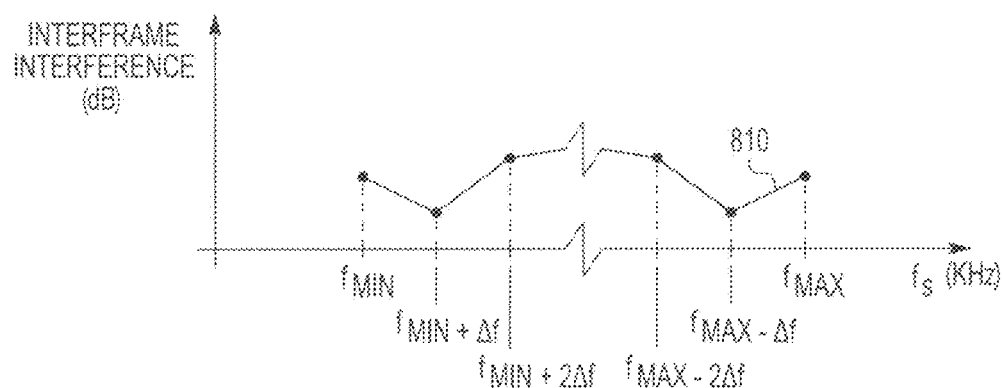
FIG. 8 illustrates a graph corresponding to an example of the interference map of FIG. 7.

FIG. 8 illustrates a graph 800 corresponding to an example of the interference map of FIG. 7. Note that graph 800 is a graphical illustration of the interference map and data corresponding to the interference map will actually be stored in non-graphical form in SRAM 514.

In graph 800, the horizontal axis represents frequency in kilohertz (kHz), and the vertical axis represents interframe interference, in decibels (dB). A waveform 810 represents the measured interframe interference. As shown in FIG. 8, interference minimums occur at $f_{MIN}+\Delta f$, and $f_{MAX}-\Delta f$ and are approximately equal. In this example, survey scan instructions 522 cause MCU 500 to select $f_{MAX}-\Delta f$ in preference to $f_{MIN}+\Delta f$, because the larger scanning frequency provides better touch resolution. Thus, the bias toward higher scan frequency causes MCU 500 to select one scan frequency instead of a second, lower scan frequency when their interferences are approximately equal. Survey scan instructions 522 can take into account an appropriate relative value weighting between scan frequency and interference for the intended application.

The decision to change the parameter (such as scan frequency as shown in FIG. 8) may further depend on the amount of interference reduction compared to the overhead to make the change.

In one embodiment, panel scan instructions 524 incorporate an interference filter. If interference, measured as the AC between two sequential panel scans, is above a threshold, then the panel scan is discarded and not used in the touch detection algorithm. The scan may be dropped, or replaced with baseline data. Moreover MCU 500 can update the baseline capacitance during normal operation using panel scan instructions 524. However if the interference exceeds a certain threshold, then panel scan instructions 524 would inhibit the baseline update based on the scan.

In addition MCU 500 can discriminate between negative and positive interference. MCU 500 determines that interference in the frame is negative interference if at least one of the capacitance values corresponding to row-column intersections in the touch panel values exceeds a negative interference threshold compared to the baseline capacitance in the direction opposite the touch signal. MCU 500 determines that interference in the frame is positive interference if a number of the capacitance values exceed a positive interference threshold is greater than a touch signature threshold in the same direction as the touch signal.

Figure 9:
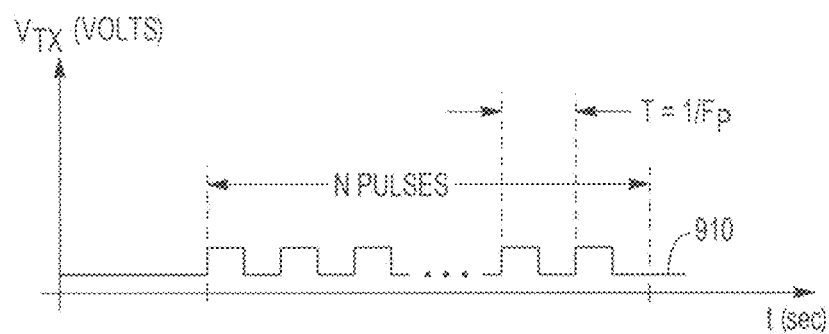
FIG. 9 illustrates a timing diagram showing the generation of pulses for use in a capacitive touch screen scan operation.

FIG. 9 illustrates a timing diagram 900 showing the generation of pulses for use in a capacitive touch screen scan operation. In FIG. 9, the horizontal axis represents time in seconds, and the vertical axis represents voltage in volts. A waveform 910 illustrates the voltage on the selected transmit line ($V_{TX}$) and FIG. 9 shows waveform 910 corresponding to a single transmit sequence of a scan. As shown in FIG. 9, each transmit sequence is characterized by a series of N pulses, each having a pulse width T, which defines a frequency of the pulses $f_P$.

The above-disclosed subject matter is to be considered illustrative, and not restrictive, and the appended claims are intended to cover all such modifications, enhancements, and other embodiments that fall within the true scope of the claims. Thus, to the maximum extent allowed by law, the scope of the present invention is to be determined by the broadest permissible interpretation of the following claims and their equivalents, and shall not be restricted or limited by the foregoing detailed description.

What is claimed is:

1. A controller for a capacitive touch screen, comprising:
   a touch resolve subsystem that in response to a trigger input measures a plurality of capacitance values using a plurality of input pins; and
   a processor that controls said touch resolve subsystem to acquire a baseline capacitance,
   to determine an interference map for each of a plurality of values of a parameter,
   wherein said interference map identifies an interference at each of said plurality of values of said parameter, and said values vary over an allowed range, and to select one of said plurality of values of said parameter based on said interference map in a calibration mode, and to acquire a frame comprising said plurality of capacitance values using said selected one of said plurality of values of said parameter in a normal operation mode,
   wherein said parameter comprises a number of scan pulses per scan line.

2. The controller of claim 1 wherein said processor acquires said baseline capacitance in said calibration mode by causing said touch resolve subsystem to measure said plurality of capacitance values using said plurality of input pins when the capacitive touch screen is in an untouched condition.

3. The controller of claim 1 wherein said processor updates said baseline capacitance in said normal operation mode in response to changing a value of a parameter used to acquire said frame.

4. The controller of claim 1 wherein said processor determines a touch location in said normal operation mode in response to both said baseline capacitance and each of said plurality of capacitance values.

5. The controller of claim 1 wherein said controller updates said baseline capacitance to a new baseline capacitance in said normal operation mode in response to said frame without entering said calibration mode.

6. The controller of claim 1 wherein said processor determines a new baseline capacitance when changing said number of scan pulses per scan line by adjusting said baseline capacitance by a ratio of a new number of scan pulses per scan line to a current number of scan pulses per line.

7. The controller of claim 1 wherein during said calibration mode said processor acquires a plurality of baseline capacitances and builds a table of baseline offsets indicating, for each of said plurality of values of said parameter, a difference between said baseline capacitance and a reference baseline capacitance at a second value of said parameter, and wherein said processor, when changing said value of said parameter to a new desired value during said normal operation mode, adjusts said baseline capacitance by said baseline offset.

8. A method for acquiring information from a capacitive touch screen comprising:
   for each of a plurality of values of a parameter:
   performing a first scan of the capacitive touch screen using a value of a parameter, wherein said parameter comprises a number of scan pulses per scan line;
   performing a second scan of the capacitive touch screen using said value of said parameter;
   determining an interference at said value of said parameter based on a difference between said second scan and said first scan; and at said value of said parameter wherein said interference map identifies an interference at each of said plurality of values of said parameter, and said values vary over an allowed range, selecting a desired value of said parameter based on said interference map;

scanning said capacitive touch screen using said desired value of said parameter; and determining a touch location in response to said scanning.

9. The method of claim 8 further comprising:

acquiring a baseline capacitance in a calibration mode;

determining a plurality of capacitance values of a frame in a normal operation mode; and updating said baseline capacitance to a new baseline capacitance in said normal operation mode in response to said frame without entering said calibration mode.

* * * * *